United States Patent [19]
Takahashi et al.

[11] Patent Number: 5,454,761
[45] Date of Patent: Oct. 3, 1995

[54] POWER TRANSMISSION BELT

[75] Inventors: Osamu Takahashi; Shizuaki Tsuruta; Takeshi Saito, all of Kobe, Japan

[73] Assignee: Bando Chemical Industries, Ltd., Kobe, Japan

[21] Appl. No.: 269,610

[22] Filed: Jul. 5, 1994

[30] Foreign Application Priority Data

Jul. 5, 1993 [JP] Japan ................................. 5-165538

[51] Int. Cl.⁶ .................................................. F16G 3/10
[52] U.S. Cl. ................................................... 474/253
[58] Field of Search .................................. 474/265–268, 474/253–257

[56] References Cited

U.S. PATENT DOCUMENTS 4,813,919  3/1989  Nosaka et al. ..................... 474/266
5,344,369  9/1994  Kitahama et al. .................. 474/253

*Primary Examiner*—Michael Powell Buiz
*Attorney, Agent, or Firm*—Sixbey, Friedman, Leedom & Ferguson; Gerald J. Ferguson, Jr.; Thomas W. Cole

[57]    ABSTRACT

A canvas of a power transmission belt has an abutting joint part seamed by a sewing machine. A machine sewing thread of the abutting joint part is adhered to the canvas beforehand by adhesive treatment so as not to separate from the canvas. Accordingly, the machine sewing thread does not float off from the canvas at reverse flex. Thus, friction noise and vibration due to interference of the machine sewing thread with a pulley at meshing at reverse flex are prevented.

6 Claims, 3 Drawing Sheets

POWER TRANSMISSION BELT

BACKGROUND OF THE INVENTION

This invention relates to a power transmission belt in which a canvas is provided on the back of an endless belt base.

Recently, accompanied by requirement for a compact engine, layout of belt is restricted. Especially, in a V-ribbed belt, a layout in such a faction the back of the belt is used as a friction face to friction-contact to a pulley is mostly employed.

In such a V-ribbed belt, a back canvas is usually provided on the back of the belt for reinforcement. It is well known, as disclosed in Laid Open unexamined Japanese Patent Application No. 4-151048, that such a back canvas is abutted and seamed at a joint part thereof by a sewing machine. The machine sewing thread used for the V-ribbed belt is made of cotton fiber, nylon fiber, aramid fiber and the like.

In the case where the joint part of the back canvas is abutted and seamed by a sewing machine, an abutting joint part c is formed by a sewing machine at formation of the canvas, as shown in FIG. 5. When the abutting Joint part is formed, the machine sewing thread already separates (floats) from the surface of the canvas b because of the rigidity thereof to be arched. Therefore, when a belt a (e.g., V-ribbed belt) with the canvas b is molded and vulcanized, the machine sewing thread d has an irregular seam pattern, as shown in FIG. 6, because of the floating. The floating machine sewing thread d is compressed to thus be fallen and warped, then is vulcanized with this state. When the vulcanized belt d is taken out from dies, the machine sewing thread d floats again from the surface, as well as the initial stage, because of the rigidity thereof.

In a case where the belt is arranged in such a fashion that the back of the belt faces inward, the machine sewing thread d deviates from the back canvas b to displace upward at the abutting joint part c of the back canvas b of the belt a, as shown in FIG. 8, which is generally called "floating". The floating machine sewing thread d interferes with a pulley at meshing to cause friction noise and vibration.

SUMMARY OF THE INVENTION

The object of the present invention is to decrease the friction noise and vibration due to the interference with pulley at reverse flex in a power transmission belt having, at the back canvas, a abutting joint part seamed by a sewing machine.

In the present invention, a power transmission belt, comprises: an endless belt base; a canvas having an abutting joint part and provided on the back of the endless belt base; a machine sewing thread which seams by a sewing machine the end parts of the abutting joint part of the canvas; and an adhesive agent for adhering the machine sewing thread to the canvas. Accordingly, since the machine sewing thread at the abutting joint part of the back canvas of the belt base is adhered to the canvas, the machine sewing thread at the abutting joint part does not float off from the canvas at reverse flex. Hence, the machine sewing thread does not interfere with the pulley at meshing, with a result of decrease in friction noise and vibration which are caused in a conventional power transmission belt, such as V-ribbed belt, with no adhesive treatment.

In the present invention, the machine sewing thread may have less than 0.15 mm diameter. With less than 0.15 mm diameter, the machine sewing thread decreases its rigidity, so that the floating amount of the machine sewing thread is reduced from the time when the canvas is abutted and seamed by a sewing machine. Thus the floating of the machine sewing thread from the canvas at the abutting joint part at reverse flex is further reduced.

The machine sewing thread may be a heat-shrinkable thread. With the heat-shrinkableness, the machine sewing thread shrinks upon heat. In other words, the machine sewing thread shrinks at vulcanization or the like, so that the floating of the machine sewing thread from the canvas at the abutting joint part at reverse flex does not occur.

The machine sewing thread may be composed of a twine. With the twine composition, instead of monofilament, the floating of the machine sewing thread from the canvas is prevented by self-shrinkage upon compression strain.

In the present invention, a power transmission belt, comprises: an endless belt base; a canvas provided on the back of the endless belt base; and an abutting joint part formed at the canvas by seaming by a sewing machine with a machine sewing thread to be removed after vulcanization. Accordingly, the machine sewing thread at the abutting joint part of the canvas is removed from the canvas on back of the belt base, thus the floating of the machine sewing thread from the canvas does not occur at reverse flex, which causes no friction noise and vibration due to interference with a pulley at meshing.

BRIEF DESCRIPTION OF THE DRAWING

The accompanying drawings show a preferred embodiment of the present invention, in which.

DETAILED DESCRIPTION OF THE INVENTION

Description is made below of a preferred embodiment of the present invention with reference to the accompanying drawings.

Figure 1:
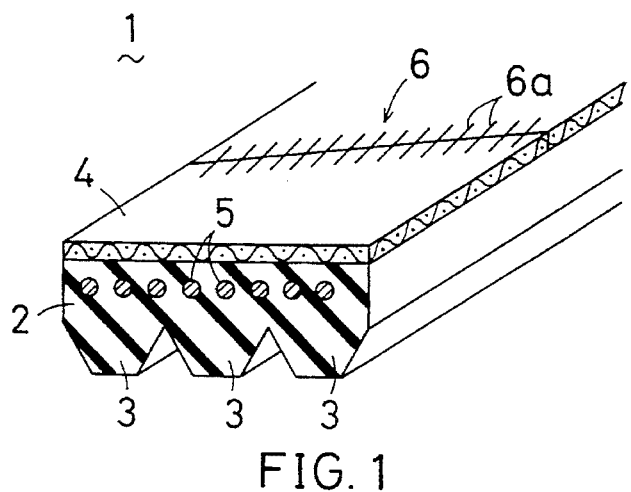
FIG. 1 is a perspective view showing a construction of a V-ribbed belt.

In FIG. 1 showing the whole construction of a V-ribbed belt 1 as a power transmission belt, a plurality of ribs 3 are formed at the bottom of an endless belt base 2 along a longitudinal direction of the belt and a canvas 4 is provided on the back of the belt base 2. The belt base 2 and each rib 3 are composed of a rubber material of a single composition of NR, SBR, CR, NBR or the like, or a blend thereof. Short fibers made of synthetic fiber such as nylon fiber, Vinylon fiber, polyester fiber, glass fiber, aromatic polyamide fiber, or natural fiber such as cotton fiber, pulp fiber are mixed, according to the necessity for reinforcement, with each rib 3 which functions as a compression rubber layer.

Low-stretch, high-strength core wires 5 made of nylon fiber, polyester fiber, aromatic polyamide and the like are embedded spirally in the belt base 2 in a peripheral direction of the belt.

The canvas 4 has an abutting joint part 6 seamed with a machine sewing thread 6a, e.g., a 40-count cotton thread, by an overlock machine or the like. The machine sewing thread 6a of the abutting joint part 6 has less than 0.15 mm diameter, and is RFL adhesive-treated beforehand according to RFL treatment or the like to adhere to the canvas 4, thereby the machine sewing thread 6a does not separate (float) from the canvas 4. With less than 0.15 mm diameter, the machine sewing thread 6a decreases its rigidity, so that the machine sewing thread less floats off from the canvas since the time when the canvas is abutted and seamed by a sewing machine. As a result, the floating of the machine sewing thread from the canvas at the abutting joint part at reverse flex is further reduced.

As the canvas 4, a fabric composed of one of cotton fiber, nylon fiber, polyester fiber or the like, a woven fabric composed of blend fabric of cotton fiber and nylon fiber or polyester fiber, a cord fabric, a nonwoven fabric or a combination thereof is used.

Accordingly, the machine sewing thread 6a of the abutting joint part 6 is adhered to the canvas 4 so as not to separate from the canvas 4, thus the machine sewing thread 6a does not float off from the canvas 4 at reverse flex. Hence, different from a conventional V-ribbed belt without adhesive treatment, the machine sewing thread does not interfere with a pulley at meshing with a result of decrease in friction noise and vibration.

In this embodiment, the machine sewing thread 6a of the abutting joint part 6 is adhered to the canvas 4. The machine sewing thread may be removed for obtaining the same effect. In detail, after molding and vulcanization, the machine sewing thread is removed by pulling off or burning.

In this embodiment, the cotton thread is used as the machine sewing thread 6a. When thread having heat-shrinkableness by heat-set treatment is used instead, the machine sewing thread shrinks by heat at vulcanization. Thus, the machine sewing thread of the abutting joint part does not float off from the canvas at reverse flex. Further, the machine sewing thread 6a may be composed of a monofilament or a twine. With the machine sewing thread 6a of twine (e.g., 6,6 nylon, 50 denier, 1×3 Z twist), the floating thereof is prevented by self-shrinkage upon compression strain.

Next, experiments conducted for testing the effect of decrease in noise in the above mentioned V-ribbed belt (3PK1100) are described.

SAMPLE BELTS

Present Invention 1

Figure 2A:
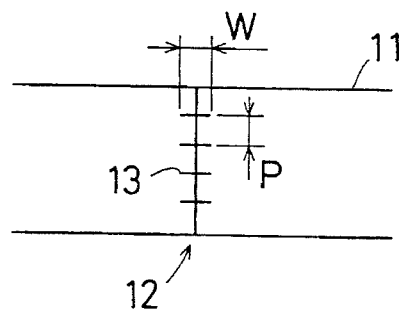
FIGS. 2(a) and 2(b) are explanatory drawings respectively showing joint parts of sample belts.

The canvas 11 is subjected to the adhesive treatment so that the machine sewing thread 13 (nylon thread of monofilament having 0.15 mm diameter, sewing pitch=3 mm, sewing width=4 mm) is adhered to the canvas 11 at the abutting joint part 12 (see FIG. 2(a)).

Present invention 2

The machine sewing thread is removed, wherein the abutting joint part before the removal is the same as in Present Invention 1.

COMPARATIVE EXAMPLE 1

The belt has the same abutting joint part seamed by a sewing machine, and is not subjected to the adhesive treatment.

COMPARATIVE EXAMPLE 2

Figure 2B:
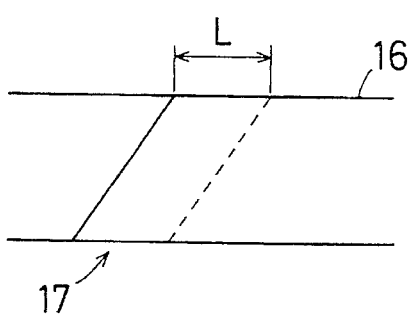

The belt has a bias joint part 17 overlapped by the canvas 16, wherein an overlap L at the bias joint part 17 of the canvas 16 is 6 mm (refer to FIG. 2(b)).

Test Apparatus

Figure 3:
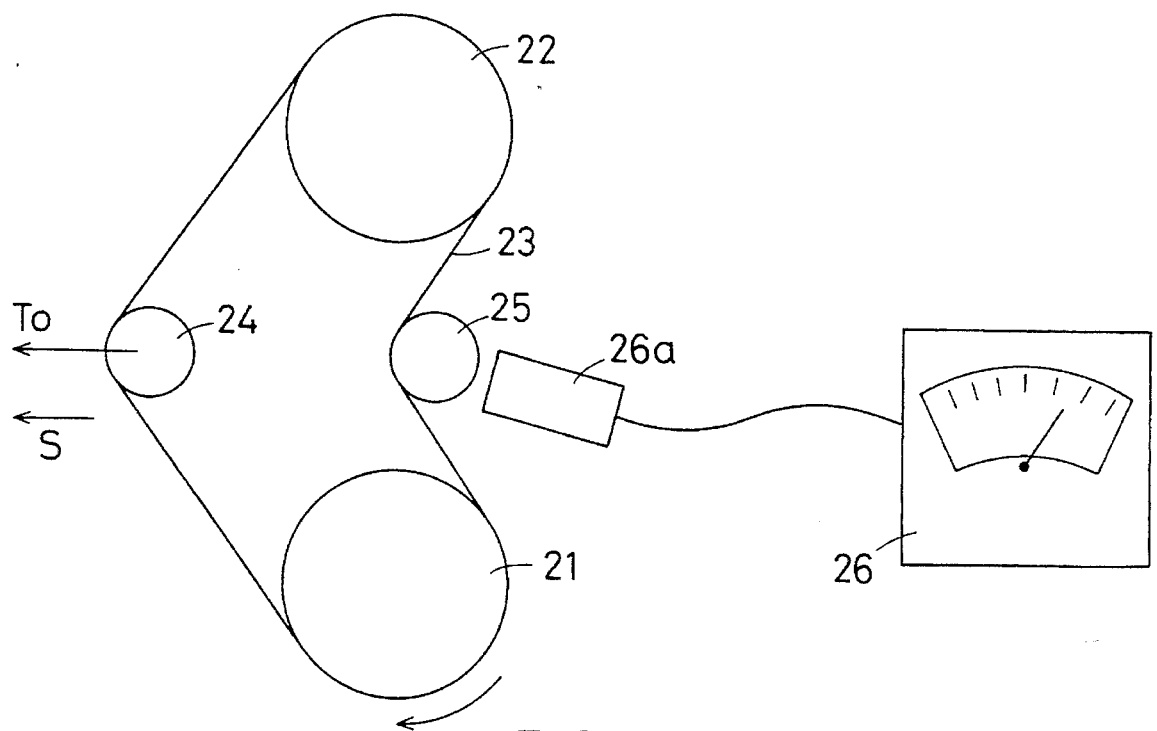
FIG. 3 is a schematic view showing a test apparatus.

As shown in FIG. 3, the sample belt 23 is trained between a drive pulley 21 (120 mm diameter, 895 rpm) and a driven pulley 22 (120 mm diameter, 0 PS output), a first idle pulley 24 (55 mm diameter) is urged to the belt 23 from the inside between the pulleys, and a second idle pulley 25 (70 mm diameter) is urged to the belt from the outside therebetween. A mike 26a is provided near the second pulley 25 to measure the noise level with a noise meter 26, while the idle pulley 24 is pulled in S direction with T0=50 kgf.

Experimental Results

Figure 4:
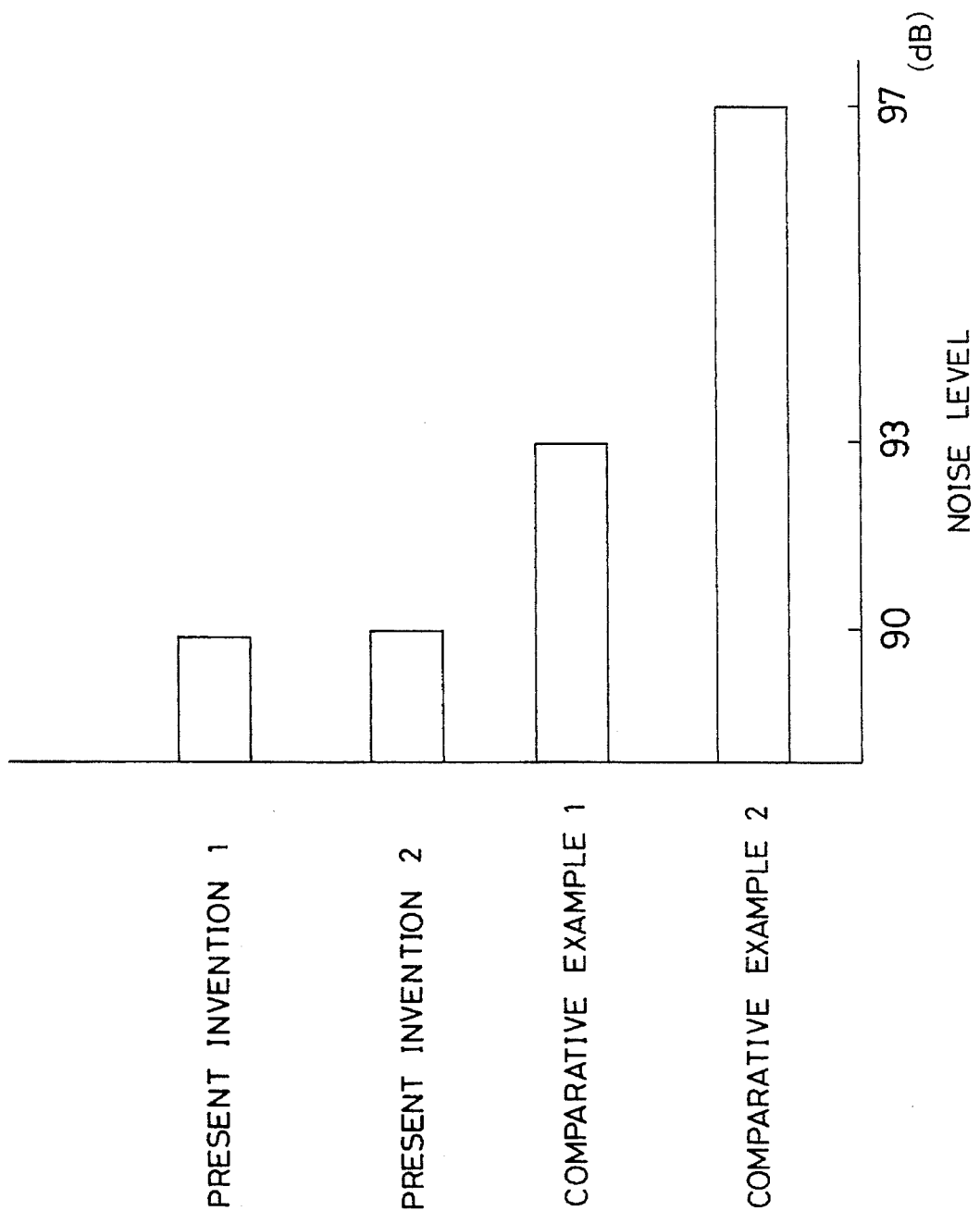
FIG. 4 is a graph showing test results.
Figure 5:
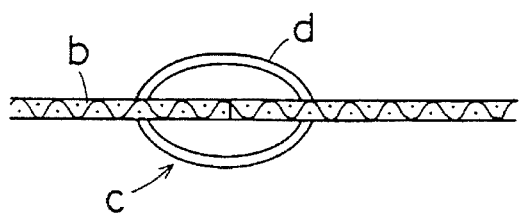
FIG. 5 is a section showing a state where a machine sewing thread floats off from the surface of a canvas after abutting joint of the canvas.
Figure 6:
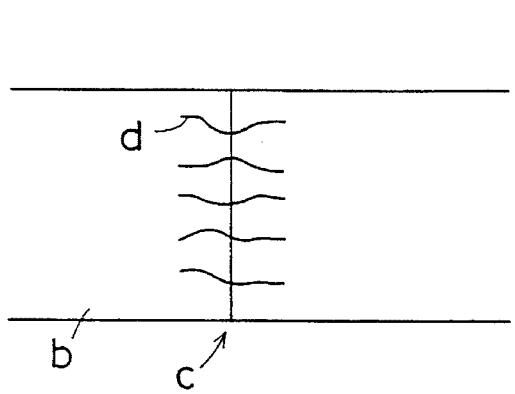
FIG. 6 is a plan view showing a state of the machine sewing thread after vulcanization of a conventional canvas.
Figure 7:
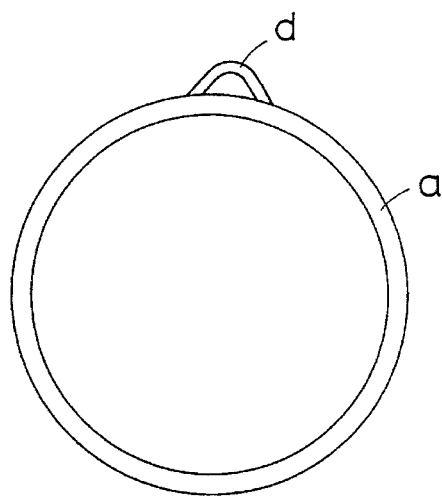
FIG. 7 is a section showing a state of the machine sewing thread at the abutting joint part after vulcanization.
Figure 8:
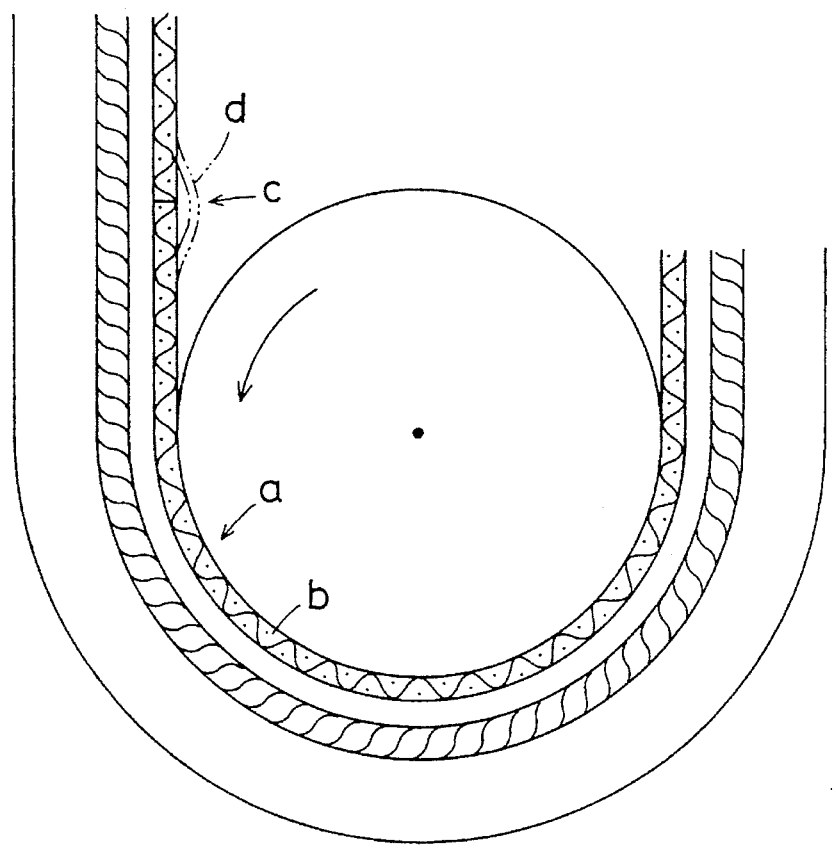
FIG. 8 is a drawing showing a state where the machine sewing thread floats off from the canvas.

The results are as shown in FIG. 4. The noise levels of the sample belts of Present Invention 1, 2 are lower than those of Comparative Examples 1, 2.

In the above embodiment, the present invention is applied to the V-ribbed belt. However, the present invention can be applied to a power transmission belt other than the V-ribbed belt. Further, the belt may be used for general machine, automobile, agricultural machine, wherein the belt is arranged in such a fashion that the canvas at the back of the belt base contacts to a pulley.

We claim:

1. A power transmission belt, comprising:

an endless belt base;

a canvas having an abutting joint part and provided on the back of said endless belt base;

a machine sewing thread which seams by a sewing machine the end parts of said abutting joint part of said canvas; and an adhesive agent for adhering said machine sewing thread to said canvas.

2. The power transmission belt of claim 1, wherein said machine sewing thread has a diameter of less than 0.15 mm.

3. The power transmission belt of claim 1, wherein said machine sewing thread is a heat-shrinkable thread.

4. The power transmission belt of claim 1, wherein said machine sewing thread is composed of a twine.

5. The power transmission belt of claim 1, which is a V-ribbed belt.

6. A power transmission belt, comprising:

an endless belt base;

a canvas provided on the back of said endless belt base; and an abutting joint part formed at the ends of said canvas by seaming by a sewing machine with a machine sewing thread to be removed after vulcanization of said belt.

* * * * *